United States Patent Office 3,045,058
Patented July 17, 1962

3,045,058
SEPARATORS FOR ELECTRIC ACCUMULATORS, ESPECIALLY LEAD ACCUMULATORS, AND PROCESS OF MANUFACTURE THEREOF
Norbert Martinak, Carinthia, Austria, assignor to Akkumulatorenfabrik Dr. Leopold Jungfer, Carinthia, Austria
No Drawing. Filed Dec. 17, 1957, Ser. No. 703,295
Claims priority, application Austria Dec. 28, 1956
23 Claims. (Cl. 136—146)

The invention relates to a separator for electric accumulators, especially lead accumulators, consisting by part or as a whole of a microporous thermoplastic material, and to a process of manufacture thereof.

Separators for electric accumulators with high discharge amperage have to comply with great demands first of all with regard to sufficient number and fineness of the pores for comfortable passage of electrolytes, and low electrical resistance. But good chemical resistance, mechanical strength and satisfactory production against possible growth of the active mass through the separators are also required. Separators made of microporous material on the basis of rubber have been known for some time, but certain separators manufactured on the basis of artificial masses which more or less comply with many of the above mentioned requirements have only recently been suggested. Such separators which for example may largely consist of polyvinyl-chloride or polystyrene will preferably be provided by a sintering operation. However it has been found, that an improvement of the plates of sintered artificial masses in several directions, particularly with regard to mechanical strength, resistance against electrolytes and active mass, and uniformity of the sintered body is desirable, especially when the separators have dimensions beyond the usual size.

It has been found, that such a result can be achieved by applying a separator made of a sintered body, which as a whole or by part is built up by polyethylene, which has been manufactured by the low pressure process.

It has been found that polyethylene produced by the low pressure process (also referred to as high density polyethylene), the range of melting temperature of which is in general between 125 and 135° C., when used for sintered separator plates gives excellent results. When using polyethylene manufactured by the old high pressure process (so called low density polyethylene), having a range of melting temperature in general between 112 and 115° C. and requiring a particular grinding operation under special precautions prior to use, one would not obtain any favourable results.

The acid resistance and the mechanical strength of separators made from low pressure polyethylene is considerably improved, while the electric resistance (relative to the space available for the pores) is not increased. Contrary to the known comparatively brittle separators made from artificial masses, for example from polystyrene, the mechanical cohesion is improved to such an extent that the separator plates can frequently be bent without rupture.

This elasticity is combined with satisfactory stiffness so that the separators, even when fairly large but rather thin, can easily and without risk be pushed into the spaces between the accumulator plates. The new separators have also a resistance to the effect of heat which increases with rising molecular weight of polyethylene. In general it is over 120° C., compared with 95 to 100° C. only for polystyrene, and 70 to 80° C. only for polyvinylchloride.

With regard to the sintering operation itself it may be said that at the above indicated high softening point of 125° C. the polyethylene particles soften rather slowly. Therefore the sintering operation can be performed as a sintering of the grain surface while the shape of the grain is maintained as far as possible. The sintering operation becomes easier, and as a consequence of the larger sintering interval of low pressure polyethylene a much less rigid control of the process is required. Nevertheless the product is obtained with extremely uniform size of the pores. In general it is also easier to detach the material from the mould in which it was sintered, because—again contrary to separators made from polystyrene—no grains of the sintered body stick to the mould.

The conditions to be observed when making sintered microporous separator plates from polystyrene, high pressure polyethylene and low pressure polyethylene respectively and the properties of these final products will be compared by the following experiments.

Separator plates having a surface of 148 x 136 mm. and a thickness of 1 mm. (2.8 mm. as measured from rib to rib) were made from pulverulent materials of (a) Polystyrene,
    (b) High pressure polyethylene,
    (c) Low pressure polyethylene, all materials having the same average grain size of 0.04 to 0.05 mm. The sintering operation was carried out by heating the powdered mass in metal moulds in a tunnel oven during an equal period of 10 minutes. The temperature in the tunnel oven had to be adjusted to the particular starting material used and was maintained for the materials above referred to (a) At 220° C.±5° C.,
    (b) At 193° C.±1° C., and
    (c) At 210° C.±5° C.

The pore size of the sintered bodies made from material (a) to (c) was approximately 20 to 40 microns.

The requirement to observe a very narrow range of the sintering temperature when making a porous body from high pressure polyethylene (b) is a serious disadvantage shown by the fact that a separator made only at an oven temperature of 190° C. could easily be rubbed off, whereas a product obtained at 195° C. tended to become at least partly compact.

The electric resistance, as measured in sulphuric acid of the density 1.24, was on an average 3.85 milliohms for separators made from low pressure polyethylene, in contrast with separators made from high pressure polyethylene having an electric resistance of more than 100 milliohms. The height of electric resistance is a feature decisive for porous separator plates and should not exceed 6 or 8 milliohms for the plates having the above dimensions.

Suitability of separator plates depends also on the absorption of water (porosity), the average values thereof amounting to 53 percent per weight for low pressure polyethylene and only to 29 percent per weight for high pressure polyethylene, calculated on the weight of the dry plate.

The resistance to heat, as determined by heating a separator plate in sulphuric acid (density 1.26) at a rate of 1° C. per minute, is as follows: A separator made from high pressure polyethylene does not undergo a change of shape at 107° C., however when heated to the boiling temperature of sulphuric acid (109° C.) it is completely shrunk. A similar separator plate made from low pressure polyethylene remains unchanged when heated to 109° C. and even higher.

The low pressure polyethylene to be applied, as stated before, should preferably have a molecular weight of at least 50,000 (calculated from viscosity measurements of polyethylene solutions according to know formulae). The best results will, however, usually be obtained with polyethylene with a molecular weight above 100,000.

It was also observed, when carrying out the process of the invention, that powdered low pressure polyethylene, when sintered and afterwards cooled down, shrinks to a considerable extent, and this may amount up to 4 percent in the length direction as well as in the transverse direction. In the manufacture of separators, for example for starters, considerable technical problems may arise out of this shrinkage. When polyethylene is sintered on supports consisting of glass wool bands, a process which is recommended in the manufacture of large separators for batteries in mining locomotives and for similar purposes, a further disadvantage is the contraction and the wavy shape of the glass wool band as a result of the shrinkage of the sintered body, and therefore manufacture from polyethylene only sometimes may not be desirable.

It had been found, that the process can be improved, and that especially the shrinkage can be prevented, when additional diluents are incorporated in the sintered body. According to this modification of the invention the sintered body contains fillers which are not attacked by the accumulator liquid.

Preferably the proportion of these diluents in the separator plate will amount to 2 to 50 percent by weight, calculated on the whole plate, but neither the mechanical strength nor the good elastic properties of the sintered body will disappear.

As fillers preventing the undesired shrinkage of the body made from the artificial mass such silicic acid containing substances can be applied which are not attacked by the electrolytes, such as for example powdered quartz, powdered glass, or natural kieselguhr. Also china clay, bentonite and similar mineral substances are suitable. Preferably the silicic acid containing substance, for example kieselguhr, will be added in such quantities, that the resulting mixture contains 95 to 80 percent by weight of polyethylene.

It has also been established, that the undesired shrinkage can also be prevented by other additional substances, which moreover improve the separator plate in other directions. When apart from low pressure polyethylene other thermoplastic substances, such as hard rubber, polyvinylchloride, polystyrene or similar substances, or also rubberlike artificial masses, as for example polyisobutylene, are incorporated in the sintered body, the elasticity of the polyethylene material, apart from its dilution, will profitably be controlled. This is not possible with mineral diluents alone. Suitable mixtures may contain for example up to 20 percent by weight of hard rubber or up to 35 percent by weight of polystyrene.

According to another modification of the invention various fibre materials, for example cellulose fibres, glass fibres or similar substances, which are fairly short, may be incorporated in the sintered body. When this material is embedded, shrinkage is removed, elasticity is fully maintained and mechanical cohesion is improved.

It has further been discovered, that contrary to separators made from polystyrene or other artificial masses fairly large quantities of foreign substances of organic origin, such as wood powder, cork powder, lignin or the like, can be admixed, for example in quantities up to 40 percent by weight (calculated with reference to the whole mixture), without unduly reducing the strength of the separator. The addition of such substances has the known purpose of introducing certain organic colloids, which contribute to the development of a fine structure of the active negative mass, advantageous for the capacity of the accumulator, and thereby have a stability improving effect on the electrolyte, particularly favourable to the negative accumulator plates.

According to another preferred modification of the invention the porous sintered separator plate at least on one side is connected with a fabric or a fibre fleece. This support, forming part of the finished separator plate, can be connected with the sintered body for example by sticking, or by fixing while sintering or hot pressing on the sintered body. By the coherent support a very high strength is given to the separator plate, and the cohesion is also secured when large quantities of additional substances are incorporated.

The invention also relates to a process of manufacture of separators which under application of low pressure polyethylene as the only or major starting material has been found to be very profitable. According to this process low pressure polyethylene of small particle size without or with disintegrated admixed substances, such as diluents, other powders of artificial masses, fibrous materials, stability improving substances and/or the like is sintered at a temperature of about 125° C. or a higher temperature and preferably under application of pressure, thereafter is cooled and cut to sizes as usual. The sintering operation can be carried out with advantage as a grain surface sintering, polyethylene being exposed to such heat, that its particles are only superficially softened, the particle shape remaining substantially unchanged.

Low pressure polyethylene will preferably be applied as a powder. Its grain size advantageously will be within the range of 0.001 to 0.1 mm. in diameter. When one or several of the above mentioned additional substances are incorporated in the sintered body, their particle size should preferably be the same or less than the particle size of polyethylene.

The porous body resulting from the sintering operation can be drawn (racked) during or after sintering as described for example in Austrian patent specification No. 189,389. If required a shaping operation can also be carried out afterwards.

Separators which on one side have to be connected with a support can be manufactured according to a preferred modification of the process of the invention. In such a case the pulverulent material to be sintered is applied to a support, preferably a fibrous or a fabric band, for example a glass wool veil, remaining in the final product, and by the sintering operation is connected with the fibrous material, the fabric or the like, to an unseparable unit.

The separators can be manufactured in moulds as usual in the art. In this case the powder of the artificial mass can be applied favourably to a steadily progressing support, and is sintered and cooled, as described for example in Austrian patent specification No. 187,302. In this way extreme uniformity of the products with regard to pore size, cohesion, elasticity and resistance is obtained.

The invention is illustrated by the following examples, but it is not limited to them.

*Example 1*

Low pressure polyethylene with a softening point of 135° C. and an average size of the grain of 0.06 mm. is heated in metal moulds for 10 minutes up to 210° C. The resulting sintered body, while it is still warm, is pressed for 5 seconds under a pressure of 3 kg./cm.$^2$ and is cooled. The press used in this example is a platen press which can be heated and cooled and yields a pressure of between about 2 to 4 kg./cm.$^2$.

It should be observed that duration and temperature of the sintering operation have much more influence on the degree of absorption of water by the sintered body than the pressure used in the process. The absorption of water is not proportionate with porosity, because a product sintered for a shorter time or at a lower temperature than those provided by the present process, although porous, will be hydrophobic. With a sintering operation too long in time or too high in temperature, the product, on the other hand, successively diminishes in porosity with the effect of a considerable increase of the electric resistance.

The obtained product is very elastic compared with separators made from other artificial masses.

*Example 2*

Low pressure polyethylene with a softening point of 135° C. and an average grain size of 0.03 mm. is applied on a support and thereafter is sintered only by heating the mass for 10 minutes up to 210° C. The resulting sintered body is removed from the support while still hot or, if desired, after cooling. It is a very porous foil which exhibits a mechanical strength sufficient for most purposes.

*Example 3*

95 parts by weight of low pressure polyethylene of another type than that used in Examples 1 and 2, i.e. a material with a softening point of 125° C. and an average grain size of 0.06 mm. are mixed with 5 parts by weight of silica with a grain fineness of 0.06 mm. in a dry state and again heated in metal moulds for 10 minutes up to 210° C. The resulting sintered body, while it is still warm, is pressed for 5 seconds under a pressure of 3 kg./cm.² and is cooled. When applied to separators this material has a very good absorbability.

*Example 4*

The product is made as indicated in Example 3, but 90 parts by weight of low pressure polyethylene are thoroughly mixed with 10 parts by weight of hard rubber dust (grain size 60 microns). The product is of excellent elasticity, but very much resists bending.

*Example 5*

80 parts by weight of low pressure polyethylene of the type given in Example 3 are mixed with 20 parts by weight of polystyrene with a grain size of 30 microns. The resulting separator plates shrink very little when cooled down, and therefore the danger of shrink cracks does not occur. The stiffness of the separator plate is considerably increased compared with plates without admixed polystyrene.

*Example 6*

The starting materials are 75 parts by weight of low pressure polyethylene, 10 parts by weight of polystyrene (of the same grain size as given in Example 5) and 15 parts by weight of wood powder (from pine) of a size which pass a sieve with the sieve number 100 according to DIN 1171. This sintered product increases the stability of the plate with the negative mass by 20 percent. In spite of the large contents of additional substances the plate is not brittle, and proves to be extremely resistant to impact and bending.

*Example 7*

Low pressure polyethylene is deposited by a feed hopper on a glass veil band, moving continuously or by stages. The band with the powder on it is transported through a furnace with an inside temperature of 220° C. wherein it remains for 9 minutes. Immediately afterwards the band together with the powder, which meanwhile has been presintered, is pressed under a press with a pressure of 4 kg./cm.², is cooled and cut to shapes as desired. Due to the partial bond between polyethylene and glass fibres the mechanical strength of the finished separators is noticeably increased.

What I claim is:

1. A battery separator which comprises a self-supporting sheet formed of self-bonded particles having a diameter of less than about 0.02 inch of sintered low pressure polyethylene, said sheet being permeable to the passage of ions therethrough and having a low ohmic resistance.

2. The battery separator of claim 1 wherein the low pressure polyethylene has a molecular weight of at least 50,000.

3. The battery separator of claim 1 having an insoluble substance evenly and uniformly distributed throughout the low pressure polyethylene sheet.

4. The battery separator of claim 3 wherein the insoluble substance is selected from the group consisting of powdered quartz, powdered glass, china clay, bentonite, and kieselguhr.

5. As a new article of manufacture, a porous separator for electric accumulators composed of 95 to 80 percent of low pressure polyethylene and 5–20 percent kieselguhr.

6. The battery separator of claim 1 wherein the self-bonded particles are of random sizes within the range of 0.001 to 0.1 mm. in diameter.

7. A porous separator for electric accumulators composed of from 5–20% kieselguhr, up to 35% polystyrene, and the remainder being low pressure polyethylene.

8. A porous separator for electric accumulators composed of from 5–20% kieselguhr, up to 20% hard rubber, and the remainder being low pressure polyethylene.

9. A process of manufacture of microporous bodies, useful as separators for electric accumulators, especially lead accumulators, which comprises in sequence the steps of applying pulverulent low pressure polyethylene (high density polyethylene) onto a support, exposing it while on the support to a temperature of at least 125° C. for a period of time, at least sufficient to sinter superficially the particles of the powder, cooling and removing the sintered body from the support, and cutting it to sizes as required.

10. The process of claim 9, wherein, before cooling and removing the sintered body from the mould pressure is applied to the low pressure polyethylene.

11. The process of claim 9, under application of pulverulent low pressure polyethylene of a particle size within the range of about 0.001 and 0.1 mm.

12. The process of claim 9, wherein the low pressure polyethylene is heated at a given temperature for such period of time, that the shape of the polyethylene particles remains substantially unchanged.

13. The process of claim 12, wherein low pressure polyethylene with a particle size within the range of about 0.03 and 0.06 mm. is exposed for approximately 8 to 10 minutes to a temperature of approximately 210° C.

14. A process of manufacture of microporous separators for electric accumulators, especially lead accumulators which comprises in sequence the steps of evenly and uniformly distributing in pulverulent low pressure polyethylene (high density polyethylene) disintegrated substances, inert to the accumulator liquid, applying the mixture onto a support, exposing it while on the support to a temperature of at least 125° C. for a period of time, at least sufficient to sinter superficially the particles of the polyethylene powder, cooling and removing the sintered body from the support, and cutting it to sizes as required.

15. The process of claim 14, wherein the pulverulent low pressure polyethylene has a particle size within the range of about 0.001 and 0.1 mm. and the substances distributed in it have at most a particle size similar to the polyethylene powder.

16. The process of claim 14, wherein, before cooling and removing the sintered body from the support, pressure is applied to the mixture.

17. The process of claim 14, wherein the mixture is exposed to heat at a given temperature for such period of time, that the shape of the polyethylene particles remains substantially unchanged.

18. The process of claim 17, wherein the mixture containing low pressure polyethylene with a particle size within the range of about 0.03 and 0.06 mm. is exposed for approximately 8 to 10 minutes to a temperature of approximately 210° C.

19. The process of claim 9, wherein the body in a state, when the sintering operation at least by part has been carried out, is racked.

20. A process of manufacture of microporous separators for electric accumulators which comprises in sequence the steps of applying pulverulent low pressure polyethylene (high density polyethylene) to a band, composed of fibres, as a layer of uniform thickness, exposing the powder on the band to a temperature of at least 125° C. for a period of time, at least sufficient to sinter superficially the particles of the powder, cooling the mixture on the band and cutting it to sizes as required, the band by the sintering operation having been connected with the sintered body to a unit, the band becoming part of the final product.

21. The process of claim 14, wherein the substance, distributed in the low pressure polyethylene powder, is selected from the group consisting of powdered quartz, kieselguhr, powdered glass, china clay, hard rubber, polyvinylchloride, polystyrene, polyisobutylene, cellulose fibres and glass fibres and bentonite.

22. The process of claim 9, wherein a stabiliser, selected from the group, consisting of wood powder, cork powder and lignin is distributed in the low pressure polyethylene powder.

23. A porous separator for electric accumulators composed of 75% polyethylene, 10% polystyrene and 15% of wood powder.

References Cited in the file of this patent

UNITED STATES PATENTS

| | | |
|---|---|---|
| 2,043,954 | Kershaw | June 9, 1936 |
| 2,428,470 | Powers | Oct. 7, 1947 |
| 2,465,493 | Strickhouser et al. | Mar. 29, 1949 |
| 2,662,929 | Dague | Dec. 15, 1953 |
| 2,676,929 | Duddy | Apr. 27, 1954 |
| 2,772,322 | Witt et al. | Nov. 27, 1956 |
| 2,909,512 | Bouce | Oct. 20, 1959 |
| 2,912,419 | Peters et al. | Nov. 10, 1959 |

FOREIGN PATENTS

| | | |
|---|---|---|
| 565,871 | Great Britain | Dec. 1, 1944 |

OTHER REFERENCES

Rubber and Plastics Age (November 1955), pub. by Maclaren House (London, England), (attn. is directed to pp. 665 and 666).